(12) United States Patent
Schwarz et al.

(10) Patent No.: US 10,125,693 B2
(45) Date of Patent: *Nov. 13, 2018

(54) GEARED TURBOFAN ENGINE WITH POWER DENSITY RANGE

(71) Applicant: United Technologies Corporation, Hartford, CT (US)

(72) Inventors: Frederick M. Schwarz, Glastonbury, CT (US); Daniel Bernard Kupratis, Wallingford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 691 days.

This patent is subject to a terminal disclaimer.

(21) Appl. No.: 14/593,056

(22) Filed: Jan. 9, 2015

(65) Prior Publication Data
US 2015/0113943 A1   Apr. 30, 2015

Related U.S. Application Data

(63) Continuation-in-part of application No. 13/446,312, filed on Apr. 13, 2012, now abandoned.

(Continued)

(51) Int. Cl.
*F02C 3/107* (2006.01)
*F02C 7/36* (2006.01)
(Continued)

(52) U.S. Cl.
CPC ............... *F02C 7/36* (2013.01); *F01D 1/26* (2013.01); *F01D 15/12* (2013.01); *F02C 3/107* (2013.01);
(Continued)

(58) Field of Classification Search
CPC ............ F02C 7/36; F02C 7/067; F01D 15/12
See application file for complete search history.

(56) References Cited

U.S. PATENT DOCUMENTS 6,732,502 B2 * 5/2004 Seda ..................... F01D 5/03
60/226.1
7,219,490 B2 * 5/2007 Dev ....................... F02C 3/045
60/226.1

(Continued)

FOREIGN PATENT DOCUMENTS

EP    2192269 A2    6/2010

OTHER PUBLICATIONS

Supplementary European Search Report for European Application No. 13837107.5 dated Jan. 28, 2016.
(Continued)

*Primary Examiner* — Justin Seabe
(74) *Attorney, Agent, or Firm* — Carlson, Gaskey & Olds, P.C.

(57) ABSTRACT

A gas turbine engine turbine has a high pressure turbine configured to rotate with a high pressure compressor as a high pressure spool in a first direction about a central axis and a low pressure turbine configured to rotate with a low pressure compressor as a low pressure spool in the first direction about the central axis. A power density is greater than or equal to about 1.5 and less than or equal to about 5.5 lbf/cubic inches. A fan is connected to the low pressure spool via a speed changing mechanism and rotates in a second direction opposed to the first direction.

24 Claims, 4 Drawing Sheets

Related U.S. Application Data

(60) Provisional application No. 61/619,111, filed on Apr. 2, 2012.

(51) Int. Cl.
    *F02K 3/06*     (2006.01)
    *F01D 1/26*     (2006.01)
    *F01D 15/12*     (2006.01)

(52) U.S. Cl.
    CPC ...... *F02K 3/06* (2013.01); *F05D 2260/40311* (2013.01); *F05D 2270/051* (2013.01)

(56) References Cited

U.S. PATENT DOCUMENTS

| | | | | |
|---|---|---|---|---|
| 7,374,403 | B2* | 5/2008 | Decker | F01D 5/141 |
| | | | | 416/223 A |
| 7,600,370 | B2 | 10/2009 | Dawson | |
| 7,694,505 | B2 | 4/2010 | Schilling | |
| 7,828,682 | B2 | 11/2010 | Smook | |
| 7,882,693 | B2* | 2/2011 | Schilling | F02C 3/107 |
| | | | | 60/204 |
| 8,015,798 | B2* | 9/2011 | Norris | F02C 3/107 |
| | | | | 60/226.1 |
| 8,061,969 | B2 | 11/2011 | Durocher et al. | |
| 8,091,371 | B2 | 1/2012 | Durocher et al. | |
| 2013/0186058 | A1 | 7/2013 | Sheridan et al. | |
| 2013/0255219 | A1 | 10/2013 | Schwarz et al. | |
| 2013/0259653 | A1 | 10/2013 | Schwarz et al. | |

OTHER PUBLICATIONS

European Search Report for European Application No. 16150651.4 dated May 24, 2016.
NASA, Engine Weight Model, Glenn Research Center, retrieved from, http://www.grc.nasa.gov/WWW/K-12/airplane/turbwt.html, Mar. 11, 2016.
Jane's Aero-Engines, Issue Seven, Copyright 2000, pp. 510-512.
Diagram of prior art V2500 and PW4090 engines.
International Preliminary Report on Patentability for PCT Application No. PCT/US/2013/034518, dated Oct. 16, 2014.
Gray, D.E. (1978). Energy efficient engine preliminary design and integration studies. Prepared for NASA. NASA CR-135396. Nov. 1978. pp. 1-366.
Reynolds, C.N. (1985). Advanced prop-fan engine technology (APET) single- and counter-rotation gearbox/pitch change mechanism. Prepared for NASA. NASA CR-168114 (vol. I). Jul. 1985. pp. 1-295.
Reynolds, C.N. (1985). Advanced prop-fan engine technology (APET) single- and counter-rotation gearbox/pitch change mechanism. Prepared for NASA. NASA CR-168114 (vol. II). Jul. 1985. pp. 1-175.
U.S. Department of Transportation: Federal Aviation Administration Type Certificate Data Sheet No. E6WE. Dated: May 9, 2000. p. 1-9.
Daly, M. and Gunston, B. (2008). Jane's Aero-Engines. Pratt & Whitney PW8000. Issue Twenty-three.
Honeywell Sabreliner 65 TFE731-3 to -3D Engine Upgrade Program. Oct. 2005. pp. 1-4.
Honeywell Learjet 31 and 35136 TFE731-2 to 2C Engine Upgrade Program. Sep. 2005. pp. 1-4.

Kurzke, J. (2012). GasTurb 12: Design and off-design performance of gas turbines. Retrieved from: https://www.scribd.com/document/153900429/GasTurb-12.
Ahmad, F. and Mizramoghadam, A.V. (1999). Single v. two stage high pressure turbine design of modern aero angines. ASME. Prestend at the International Gast Turbine & Aeroengine Congress & Exhibition. Indianapolis, Indiana. Jun. 7-10, 1999. pp. 1-9.
English translation of Measurement and calculation methodology on TFE731-2, TFE731-3A and TFE731-3D models.
English translation of Expert certificate concerning the technical nature of the drawings used in the measurement and calculation methodology.
Declaration of Raymond Drago. In re U.S. Pat. No. 8,297,916. IPR2018-01172. Executed May 29, 2018. pp. 1-115.
Parker, R.G. and Lin, J. (2001). Modeling, modal properties, and mesh stiffness variation instabilities of planetary gears. Prepared for NASA. NASA/CR-2001-210939. May 2001. pp. 1-111.
Declaration of Courtney H. Bailey. In re U.S. Pat. No. 8,511,605. Executed Jul. 19, 2016. pp. 1-4.
Mancuso, J.R. and Corcoran, J.P. (2003). What are the differences in high performance flexible couplings for turbomachinery? Proceedings of the Thirty-Second Turbomachinery Symposium. 2003. pp. 189-207.
Dudley, D.W., Ed. (1994). Practical gear design. New York, NY: McGraw-Hill. pp. 119-124.
Petition for Inter Partes Review of U.S. Pat. No. 8,297,916. *General Electric Company*, Petitioner, v. *United Technologies Corporation*, Patent Owner. IPR2018-01171. Filed May 30, 2018.
Petition for Inter Partes Review of U.S. Pat. No. 8,297,916. *General Electric Company*, Petitioner, v. *United Technologies Corporation*, Patent Owner. IPR2018-01172. Filed May 30, 2018.
English Translation of Notice of Opposition to Patent No. EP2949882. United Technologies Corporation opposed by Rolls Royce. dated Aug. 23, 2017.
English Translation of Notice of Opposition to Patent No. EP2811120. United Technologies Corporation opposed by Safran Aircraft Engines. dated Jul. 12, 2017.
English Translation of Notice of Opposition to Patent No. EP299882. United Technologies Corporation opposed by Safran Aircraft Engines. dated May 23, 2018.
English Translation of Notice of Opposition to Patent No. EP2811120. United Technologies Corporation opposed by Rolls Royce. dated Apr. 12, 2018.
About GasTurb. Retrieved Jun. 26, 2018 from: http://gasturb.de/about-gasturb.html.
Kurzke, J. (2001). GasTurb 9: A porgram to calculate design and off-design performance of gas turbines. Retrieved from: https://www.scribd.com/document/92384867/GasTurb9Manual.
Tummers, B. (2006). DataThief III. Retreived from: https://datathief.org/DatathiefManual.pdf pp. 1-52.
Manual. Student's Guide to Learning SolidWorks Software. Dassault Systemes—SolidWorks Corporation. pp. 1-156.
Macisaac, B. and Langston, R. (2011). Gas turbine propulsion systems. Chichester, West Sussex: John Wiley & Sons, Ltd. pp. 260-5.
Datasheet. CFM56-5B for the Airbus A320ceo family and CFM56-7B for the Boeing 737 family. https://www.cfmaeroengines.com/.
Turner, M. G., Norris, A., and Veres, J.P. (2004). High-fidelity three-dimensional simulation of the GE90. NASA/TM-2004-212981. pp. 1-18.
Petition for Inter Partes Review of U.S. Pat. No. 9,695,751. *General Electric Company*, Petitioner, v. *United Technologies Corporation*, Patent Owner. IPR2018-01442. Filed Jul. 24, 2018.

\* cited by examiner

GEARED TURBOFAN ENGINE WITH POWER DENSITY RANGE

CROSS-REFERENCE TO RELATED APPLICATION

This application is a continuation-in-part of U.S. patent application Ser. No. 13/446,312, filed Apr. 13, 2012, which claims priority to U.S. Provisional Application No. 61/619,111, filed Apr. 2, 2012.

BACKGROUND OF THE INVENTION

This application relates to a geared turbofan gas turbine engine, wherein the low and high pressure spools rotate in the same direction relative to each other.

Gas turbine engines are known, and typically include a fan delivering air into a compressor section, and outwardly as bypass air to provide propulsion. The air in the compressor is delivered into a combustion section where it is mixed with fuel and burned. Products of this combustion pass downstream over turbine rotors, driving them to rotate. Typically there are low and high pressure compressors, and low and high pressure turbines.

The high pressure turbine typically drives the high pressure compressor as a high spool, and the low pressure turbine drives the low pressure compressor and the fan. Historically, the fan and low pressure compressor were driven at a common speed.

More recently, a gear reduction has been provided on the low pressure spool such that the fan and low pressure compressor can rotate at different speeds. It desirable to have more efficient engines that have more compact turbines to limit efficiency loses.

SUMMARY

In a featured embodiment, a gas turbine engine turbine comprises a high pressure turbine configured to rotate with a high pressure compressor as a high pressure spool in a first direction about a central axis. A low pressure turbine is configured to rotate with a low pressure compressor as a low pressure spool in the first direction about the central axis. A power density is greater than or equal to about 1.5 and less than or equal to about 5.5 lbf/in$^3$. A fan is connected to the low pressure spool via a speed changing mechanism and will rotate in a second direction opposed to the first direction.

In another embodiment according to the previous embodiment, the power density is greater than or equal to about 2.0.

In another embodiment according to any of the previous embodiments, the power density is greater than or equal to about 4.0.

In another embodiment according to any of the previous embodiments, the power density thrust is calculated using a value that is sea level take-off, flat-rated static thrust.

In another embodiment according to any of the previous embodiments, guide vanes are positioned upstream of a first stage in the low pressure turbine to direct gases downstream of the high pressure turbine as they approach the low pressure turbine.

In another embodiment according to any of the previous embodiments, a mid-turbine frame supports the high pressure turbine.

In another embodiment according to any of the previous embodiments, the guide vanes are positioned intermediate the mid-turbine frame and the low pressure turbine.

In another embodiment according to any of the previous embodiments, the guide vanes are highly cambered such that the vanes direct products of combustion downstream of the high pressure turbine to be properly directed when initially encountering the first stage of the low pressure turbine.

In another embodiment according to any of the previous embodiments, the fan section delivers a portion of air into a bypass duct and a portion of the air into the low pressure compressor as core flow, and has a bypass ratio greater than 6.

In another embodiment according to any of the previous embodiments, the speed changing mechanism is a gear reduction.

In another embodiment according to any of the previous embodiments, a star gear is utilized to change the direction of rotation between the fan and the low pressure spool.

In another embodiment according to any of the previous embodiments, the star gear arrangement has a gear ratio above 2.3:1, meaning that the low pressure spool turns at least or equal to about 2.3 times as fast as the fan.

In another embodiment according to any of the previous embodiments, the speed changing mechanism is a gear reduction.

In another embodiment according to any of the previous embodiments, a star gear is utilized to change the direction of rotation between the fan and the low pressure spool.

In another embodiment according to any of the previous embodiments, the star gear arrangement has a gear ratio above 2.3:1, meaning that the low pressure spool turns at least or equal to about 2.3 times as fast as the fan.

In another featured embodiment, a gas turbine engine turbine comprises a high pressure turbine configured to rotate with a high pressure compressor as a high pressure spool in a first direction about a central axis. A low pressure turbine is configured to rotate in the first direction about the central axis. A power density is greater than or equal to about 4.0. A fan is connected to the low pressure turbine via a gear reduction and will rotate in a second direction opposed to the first direction.

In another embodiment according to the previous embodiment, the power density is a ratio of a thrust provided by the engine to a volume of a turbine section including both the high pressure turbine and the low pressure turbine. The thrust is sea level take-off, flat-rated static thrust.

In another embodiment according to any of the previous embodiments, the fan section delivers a portion of air into a bypass duct and a portion of the air into the low pressure compressor as core flow, and has a bypass ratio greater than 6.

In another embodiment according to any of the previous embodiments, a star gear is utilized to change the direction of rotation between the fan and the low pressure spool.

In another embodiment according to any of the previous embodiments, there is an intermediate turbine section, which drives a compressor rotor.

In another embodiment according to any of the previous embodiments, the gear reduction is positioned intermediate the fan and a compressor rotor driven by the low pressure turbine.

In another embodiment according to any of the previous embodiments, the gear reduction is positioned intermediate the low pressure turbine and a compressor rotor driven by the low pressure turbine.

These and other features may be best understood from the following drawings and specification.

DETAILED DESCRIPTION

Figure 1:
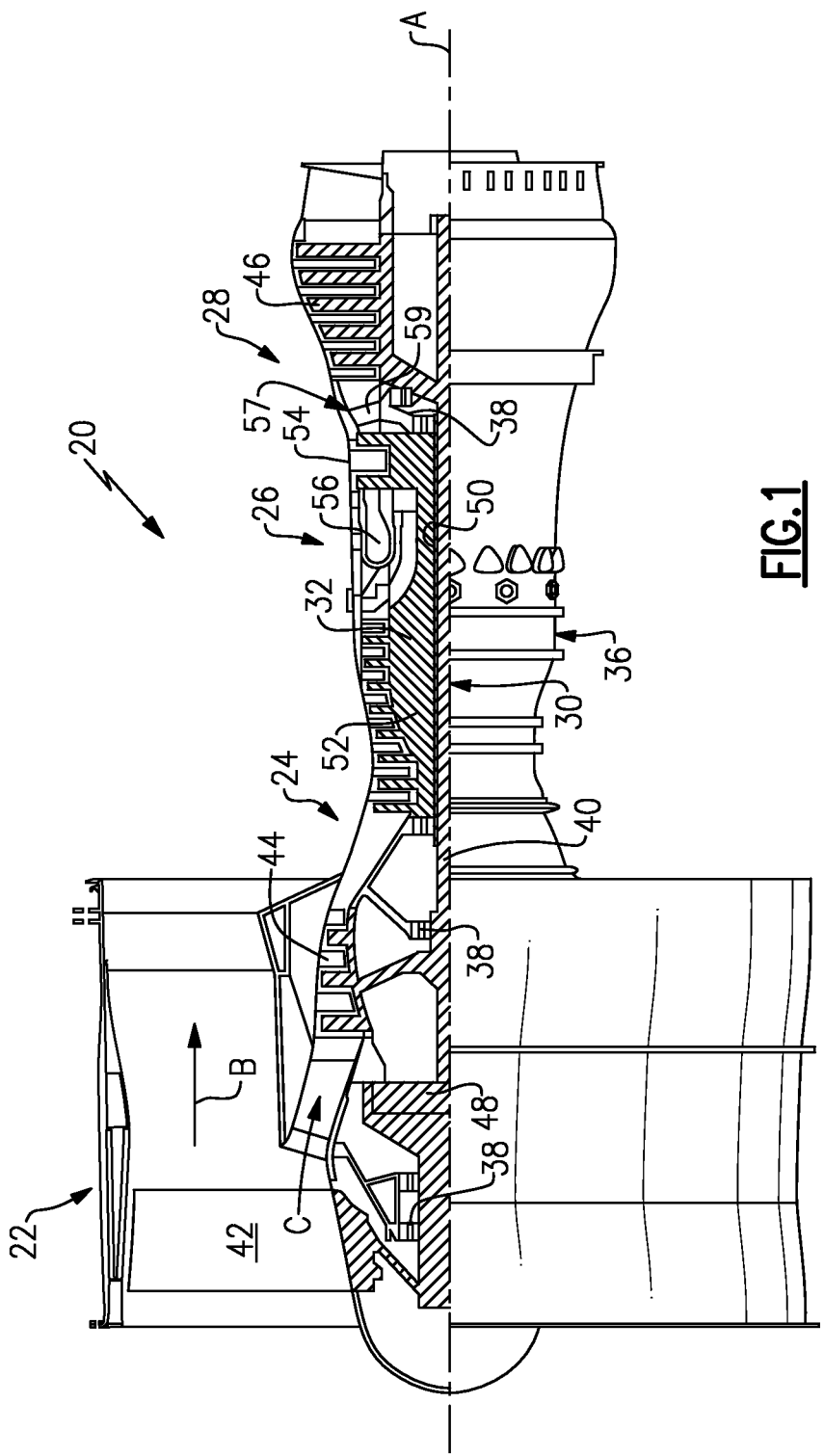
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include, for example, three-spools, an augmentor section, or a different arrangement of sections, among other systems or features. The fan section 22 drives air along a bypass flowpath B while the compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines. For purposes of this application, the terms "low" and "high" as applied to speed or pressure are relative terms. The "high" speed and pressure would be higher than that associated with the "low" spools, compressors or turbines, however, the "low" speed and/or pressure may actually be "high."

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. The terms "high" and "low" in relation to both the speed and pressure of the components are relative to each other, and not to an absolute value. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path and act as inlet stator vanes to turn the flow to properly feed the first blades of the low pressure turbine. The turbines 46, 54 rotationally drive the respective low speed spool 30 and high speed spool 32 in response to the expansion.

The engine 20 has bypass airflow B, and in one example is a high-bypass geared aircraft engine. The bypass ratio may be defined as the amount of air delivered into the bypass duct divided by the amount delivered into the core flow. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 and the low pressure turbine has a pressure ratio that is greater than about 5:1. Low pressure turbine 46 pressure ratio is the total pressure measured prior to inlet of low pressure turbine 46 as related to the pressure at the outlet of the low pressure turbine 46 prior to an exhaust nozzle. The geared architecture 48 may be a star gear arrangement such that the fan will rotate in a different direction than the low spool. It should be understood, however, that the above parameters are only exemplary of one embodiment of a geared architecture engine and that the present invention is applicable to other gas turbine engines including direct drive turbofans.

A greatest amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned per hour divided by lbf of thrust the engine produces at that minimum point. "Low fan pressure ratio" is the pressure ratio across the fan blade alone, before the Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram deg R)/518.7)^0.5]. The "Low corrected fan tip speed" as disclosed herein according to one non-limiting embodiment is less than about 1150 ft/second at the same cruise point.

Figure 2:
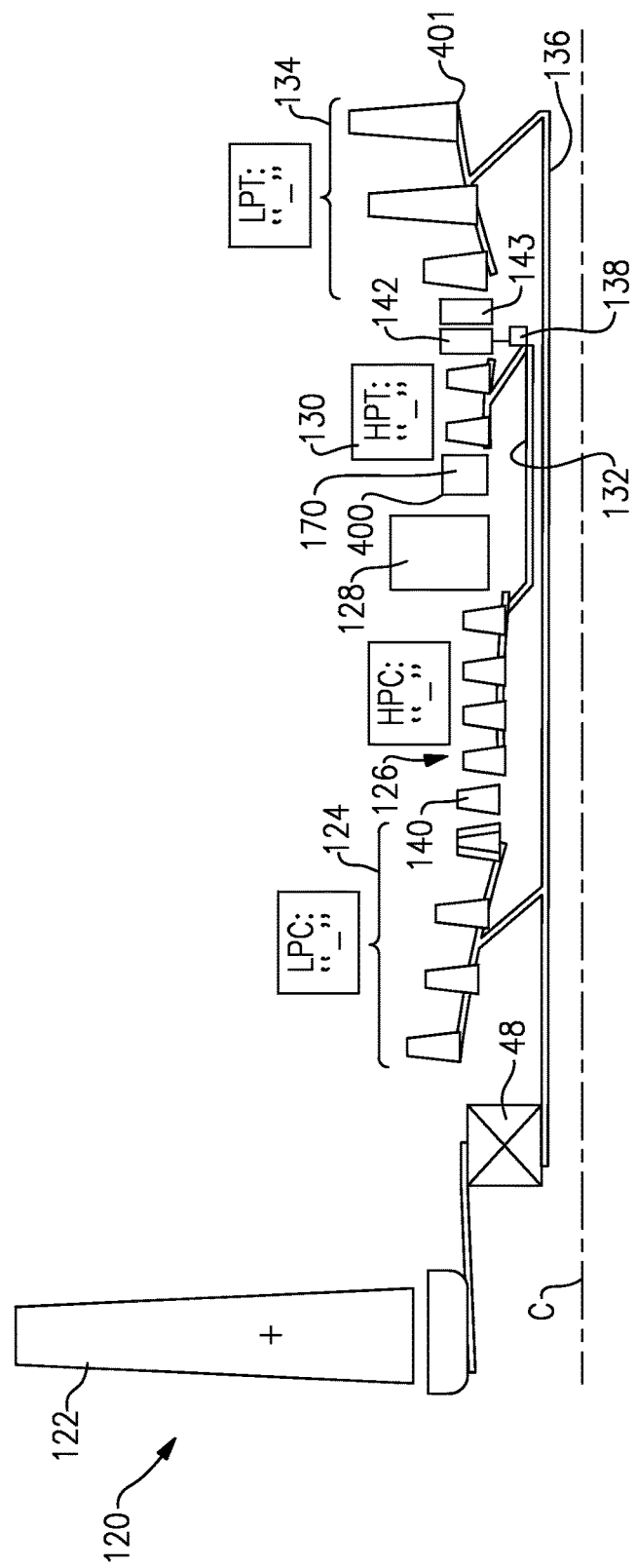
FIG. 2 schematically shows rotational features of one type of such an engine.

FIG. 2 shows detail of an engine 120, which may generally have the features of engine 20 of FIG. 1. A fan 122 is positioned upstream of a low pressure compressor 124, which is upstream of a high pressure compressor 126. A combustor 128 is positioned downstream of the high pressure compressor 126. A mid-turbine frame 142 may be positioned at a downstream end of the high pressure turbine 130, and supports a bearing 138, shown schematically, to support the aft end of the high pressure turbine 130, and a high pressure spool 132. A low pressure turbine 134 is positioned downstream of a mid-turbine frame 142. A low spool 136, driven by the low pressure turbine 134, drives the low pressure compressor 124. The speed change mechanism 48 causes the fan 122 to rotate at a different speed than the low pressure compressor 134. In embodiments of this invention, the speed input to output ratio for the speed change mechanism is above or equal to 2.3:1, and up to less than or equal to 13:1. The gear also causes fan 122 to rotate in an opposed direction relative to the low pressure compressor 124. As mentioned above, a star gear arrangement may be utilized to cause the fan 122 to rotate in the opposed direction ("+") relative to the low pressure compressor 124. In this embodiment the fan generally has less than 26 blades, and the low pressure turbine has at least three stages, and up to six stages. The high pressure turbine generally has one or two stages as shown.

In this particular embodiment, the low pressure compressor 124 and the low pressure turbine 134 rotate in one direction ("−") and the high pressure turbine 130, the high pressure compressor 126, rotate in the same direction ("−").

A strut 140 is shown between the low pressure compressor 124 and the high pressure compressor 126. The strut 140 spans the gas path, and has an airfoil shape, or at least a streamline shape. The combination of a blade at the exit of the low pressure compressor 124, the strut 140, and a variable vane, and then the first blade of the high pressure compressor 126 is generally encompassed within the structure illustrated as the strut 140.

Since the compressor sections 124 and 126 rotate in the same direction, the several airfoils illustrated as the element 140 are required to do less turning of the air flow.

As will be explained below, since the turbine section is provided with a highly cambered vane, there is less turning required between the two turbine sections. Since the compressor is forcing flow with an adverse pressure gradient, and whereas the turbine has a favorable pressure gradient, this overall engine architecture is benefited by the illustrated combination.

Highly cambered inlet guide vanes 143 are positioned in a location intermediate the mid-turbine frame 142 and the most upstream rotor in the low pressure turbine 134. The vanes 143 must properly direct the products of combustion downstream of the high pressure turbine 130 as they approach the first rotor of the low pressure turbine 134. It is desirable for reducing the overall size of the low pressure turbine that the flow be properly directed when it initially encounters the first stage of the low pressure turbine section.

The above features achieve a more compact turbine section volume relative to the prior art, including both the high and low pressure turbines. A range of materials can be selected. As one example, by varying the materials for forming the low pressure turbine, the volume can be reduced through the use of more expensive and more exotic engineered materials, or alternatively, lower priced materials can be utilized. In three exemplary embodiments the first rotating blade of the Low Pressure Turbine can be a directionally solidified casting blade, a single crystal casting blade or a hollow, internally cooled blade. All three embodiments will change the turbine volume to be dramatically smaller than the prior art by increasing low pressure turbine speed. In addition, high efficiency blade cooling may be utilized to further result in a more compact turbine section.

Due to the compact turbine section, a power density, which may be defined as thrust in pounds force produced divided by the volume of the entire turbine section, may be optimized. The volume of the turbine section may be defined by an inlet of a first turbine vane in the high pressure turbine to the exit of the last rotating airfoil in the low pressure turbine, and may be expressed in cubic inches. The static thrust at the engine's flat rated Sea Level Takeoff condition divided by a turbine section volume is defined as power density. The sea level take-off flat-rated static thrust may be defined in lbs force, while the volume may be the volume from the annular inlet of the first turbine vane in the high pressure turbine to the annular exit of the downstream end of the last rotor section in the low pressure turbine. The maximum thrust may be Sea Level Takeoff Thrust "SLTO thrust" which is commonly defined as the flat-rated static thrust produced by the turbofan at sea-level.

Figure 3:
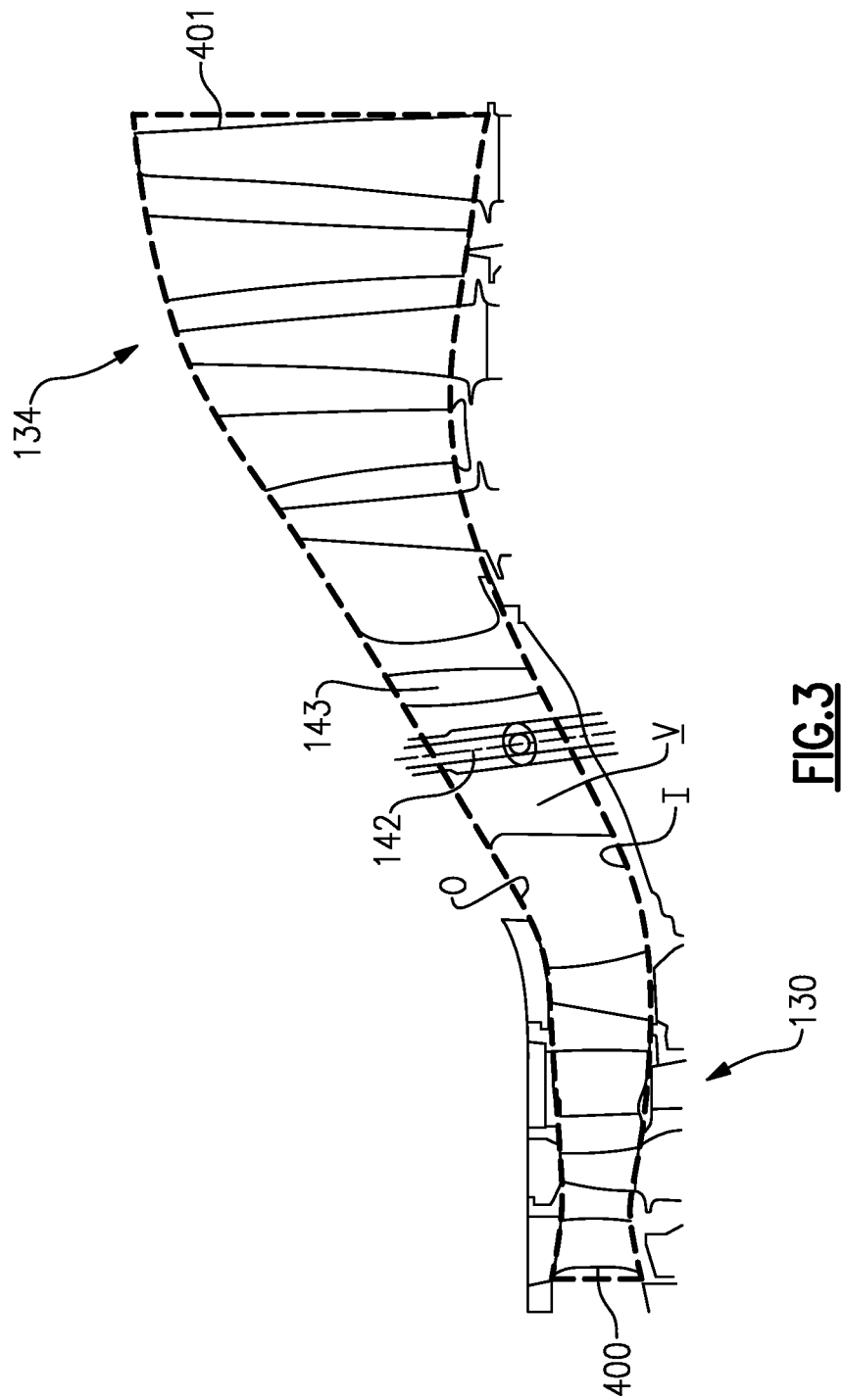
FIG. 3 is a detail of the turbine section volume.

The volume V of the turbine section may be best understood from FIG. 3. As shown, the frame 142 and vane 143 are intermediate the high pressure turbine section 130, and the low pressure turbine section 134. The volume V is illustrated by dashed line, and extends from an inner periphery I to an outer periphery O. The inner periphery is somewhat defined by the flowpath of the rotors, but also by the inner platform flow paths of vanes. The outer periphery is defined by the stator vanes and outer air seal structures along the flowpath. The volume extends from a most upstream end of the vane 400, typically its leading edge, and to the most downstream edge 401 of the last rotating airfoil in the low pressure turbine section 134. Typically this will be the trailing edge of that airfoil.

The power density in the disclosed gas turbine engine is much higher than in the prior art. Eight exemplary engines are shown below which incorporate turbine sections and overall engine drive systems and architectures as set forth in this application, and can be found in Table I as follows:

TABLE 1

| Engine | Thrust SLTO (lbf) | Turbine section volume from the Inlet | Thrust/turbine section volume (lbf/in$^3$) |
|---|---|---|---|
| 1 | 17,000 | 3,859 | 4.41 |
| 2 | 23,300 | 5,330 | 4.37 |
| 3 | 29,500 | 6,745 | 4.37 |
| 4 | 33,000 | 6,745 | 4.84 |
| 5 | 96,500 | 31,086 | 3.10 |
| 6 | 96,500 | 62,172 | 1.55 |
| 7 | 96,500 | 46,629 | 2.07 |
| 8 | 37,098 | 6,745 | 5.50 |

Thus, in embodiments, the power density would be greater than or equal to about 1.5 lbf/in$^3$. More narrowly, the power density would be greater than or equal to about 2.0 lbf/in$^3$.

Even more narrowly, the power density would be greater than or equal to about 3.0 lbf/in$^3$.

More narrowly, the power density is greater than or equal to about 4.0 lbf/in$^3$. More narrowly, the power density is greater than or equal to about 4.5 lbf/in$^3$. Even more narrowly, the power density is greater than or equal to about 4.75 lbf/in$^3$. Even more narrowly, the power density is greater than or equal to about 5.0 lbf/in$^3$.

Also, in embodiments, the power density is less than or equal to about 5.5 lbf/in$^3$.

While certain prior engines have had power densities greater than 1.5, and even greater than 3.2, such engines have been direct drive engines and not associated with a gear reduction. In particular, the power density of an engine known as PW4090 was about 1.92 lbf/in$^3$, while the power density of an engine known as V2500 had a power density of 3.27 lbf/in$^3$.

Engines made with the disclosed architecture, and including turbine sections as set forth in this application, and with modifications coming from the scope of the claims in this application, thus provide very high efficient operation, and increased fuel efficiency and lightweight relative to their trust capability.

Figure 4:
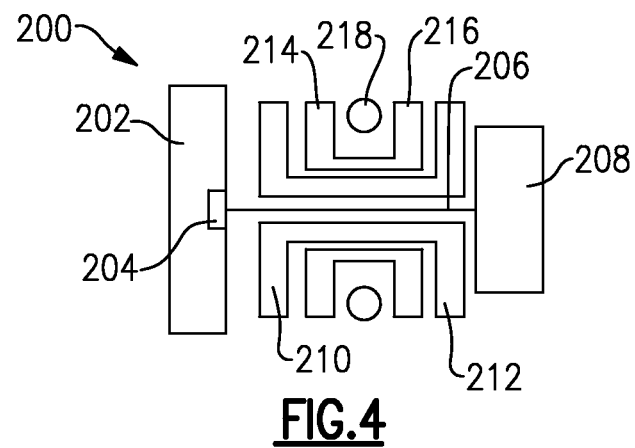
FIG. 4 shows another embodiment.

FIG. 4 shows an embodiment 200, wherein there is a fan drive turbine 208 driving a shaft 206 to in turn drive a fan rotor 202. A gear reduction 204 may be positioned between the fan drive turbine 208 and the fan rotor 202. This gear reduction 204 may be structured and operate like the gear reduction disclosed above. A compressor rotor 210 is driven by an intermediate pressure turbine 212, and a second stage compressor rotor 214 is driven by a turbine rotor 216. A combustion section 218 is positioned intermediate the compressor rotor 214 and the turbine section 216.

Figure 5:
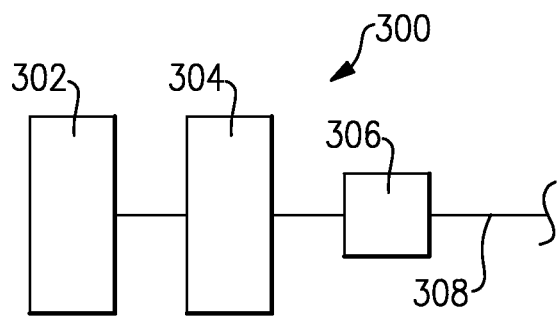
FIG. 5 shows yet another embodiment.

FIG. 5 shows yet another embodiment 300 wherein a fan rotor 302 and a first stage compressor 304 rotate at a common speed. The gear reduction 306 (which may be structured as disclosed above) is intermediate the compressor rotor 304 and a shaft 308 which is driven by a low pressure turbine section.

The FIG. 4 or 5 engines may be utilized with the density features disclosed above.

Although an embodiment of this invention has been disclosed, a person of ordinary skill in this art would recognize that certain modifications would come within the scope of this application. For that reason, the following claims should be studied to determine the true scope and content of this invention.

The invention claimed is:

1. A gas turbine engine turbine comprising:
   a high pressure turbine configured to rotate with a high pressure compressor as a high pressure spool in a first direction about a central axis;
   a low pressure turbine configured to rotate with a low pressure compressor as a low pressure spool in said first direction about said central axis;
   a power density that is greater than or equal to about 1.5 and less than or equal to about 5.5 lbf/in$^3$; and
   a fan connected to the low pressure spool via a speed changing mechanism and will rotate in a second direction opposed to said first direction.

2. The engine as set forth in claim 1, wherein said power density is greater than or equal to about 2.0 and less than or equal to about 5.5 lbf/in$^3$.

3. The engine as set forth in claim 2, wherein said power density is greater than or equal to about 4.0 and less than or equal to about 5.5 lbf/in$^3$.

4. The engine as set forth in claim 3, comprising:
   a turbine section including the low pressure turbine and the high pressure turbine; and
   wherein a volume of the turbine section is between 3,859 and 6,745 in$^3$.

5. The engine as set forth in claim 4, wherein:
   said power density thrust is calculated using a value that is sea level take-off, flat-rated static thrust;
   said high pressure turbine is a two stage turbine, said low pressure turbine includes three stages, but no more than six stages, said high pressure compressor includes four stages, and said low pressure compressor includes three stages; and
   said fan has 26 or fewer fan blades and a low fan pressure ratio of less than 1.45.

6. The engine as set forth in claim 1, wherein said power density thrust is calculated using a value that is sea level take-off, flat-rated static thrust.

7. The engine as set forth in claim 6, wherein guide vanes are positioned upstream of a first stage in said low pressure turbine to direct gases downstream of said high pressure turbine as they approach said low pressure turbine.

8. The engine as set forth in claim 7, wherein a mid-turbine frame supports said high pressure turbine.

9. The engine as set forth in claim 8, wherein said guide vanes are positioned intermediate said mid-turbine frame and said low pressure turbine.

10. The engine as set forth in claim 7, wherein said guide vanes are highly cambered such that said vanes direct products of combustion downstream of the high pressure turbine to be properly directed when initially encountering the first stage of the low pressure turbine.

11. The engine as set forth in claim 1, wherein said fan section delivering a portion of air into a bypass duct and a portion of the air into said low pressure compressor as core flow, and having a bypass ratio greater than 6.

12. The engine as set forth in claim 11, wherein said speed changing mechanism is a gear reduction.

13. The engine as set forth in claim 12, wherein a star gear is utilized to change the direction of rotation between said fan and said low pressure spool.

14. The engine as set forth in claim 13, wherein said star gear arrangement having a gear ratio above 2.3:1, meaning that the low pressure spool turns at least or equal to about 2.3 times as fast as said fan.

15. The engine as set forth in claim 1, wherein said speed changing mechanism is a gear reduction.

16. The engine as set forth in claim 15, wherein a star gear is utilized to change the direction of rotation between said fan and said low pressure spool.

17. The engine as set forth in claim 16, wherein said star gear arrangement having a gear ratio above 2.3:1, meaning that the low pressure spool turns at least or equal to about 2.3 times as fast as said fan.

18. A gas turbine engine turbine comprising:
    a high pressure turbine configured to rotate with a high pressure compressor as a high pressure spool in a first direction about a central axis;
    a low pressure turbine configured to rotate in said first direction about said central axis;
    a power density that is greater than or equal to about 4.0 and less than or equal to 5.5 lbf/in$^3$; and
    a fan connected to the low pressure turbine via a gear reduction and will rotate in a second direction opposed to said first direction.

19. The engine as set forth in claim 18, wherein said power density is a ratio of a thrust provided by said engine to a volume of a turbine section including both said high pressure turbine and said low pressure turbine, said thrust is sea level take-off, flat-rated static thrust.

20. The engine as set forth in claim 18, wherein said fan section delivering a portion of air into a bypass duct and a portion of the air into said low pressure compressor as core flow, and having a bypass ratio greater than 6.

21. The engine as set forth in claim 18, wherein a star gear is utilized to change the direction of rotation between said fan and said low pressure spool.

22. The engine as set forth in claim 18, wherein there is an intermediate turbine section, and the intermediate turbine section drives a compressor rotor.

23. The engine as set forth in claim 18, wherein the gear reduction is positioned intermediate the fan and a compressor rotor driven by the low pressure turbine.

24. The engine as set forth in claim 18, wherein the gear reduction is positioned intermediate the low pressure turbine and a compressor rotor driven by the low pressure turbine.

* * * * *